United States Patent [19]
Gibson et al.

[11] Patent Number: 6,100,329
[45] Date of Patent: Aug. 8, 2000

[54] REVERSIBLE, MECHANICALLY INTERLOCKED POLYMERIC NETWORKS WHICH SELF-ASSEMBLE

[75] Inventors: Harry W. Gibson, Blacksburg, Va.; Caiguo Gong, Richmond, Calif.

[73] Assignee: Virginia Tech Intellectual Properties, Inc., Blacksburg, Va.

[21] Appl. No.: 09/038,934

[22] Filed: Mar. 12, 1998

[51] Int. Cl.[7] .................................................... C08G 81/00
[52] U.S. Cl. ............................. 525/55; 525/919; 525/403; 525/418; 525/420; 525/452; 525/453; 525/461
[58] Field of Search ..................................... 525/410, 418, 525/452, 523, 55, 403, 420, 453, 461, 919

[56] References Cited

U.S. PATENT DOCUMENTS 5,302,729  4/1994  Gibson et al. .
5,538,655  7/1996  Fauteux et al. .

FOREIGN PATENT DOCUMENTS 22 55 622  5/1974  Germany .
23 23 607  11/1974  Germany .

OTHER PUBLICATIONS

Translation of DE 2255622, May 1974.
Translation of DE 2323607, Nov. 1974.
Harada et al., Nature, p. 516–518, 1993.

*Primary Examiner*—Jeffrey C. Mullis
*Attorney, Agent, or Firm*—Whitham, Curtis & Whitham

[57] ABSTRACT

Polymeric structure involving a first polymer having a linear segment and a second polymer having a macrocyle which is threaded onto said linear segment to form a rotaxane complex. The rotaxane complex is capable of reversibly dissociating back into the individual polymers under the influence of an external factor, such as temperature and/or solvent exposure.

9 Claims, 11 Drawing Sheets

— — 4,4'-BIPYRIDINIUM SALT DERIVATIVES

⬭ — CROWN ETHERS, E.G., BIS(1,3-PHENYLENE)-32-CROWN-10

⌇⌇⌇ — POLYMER CHAINS

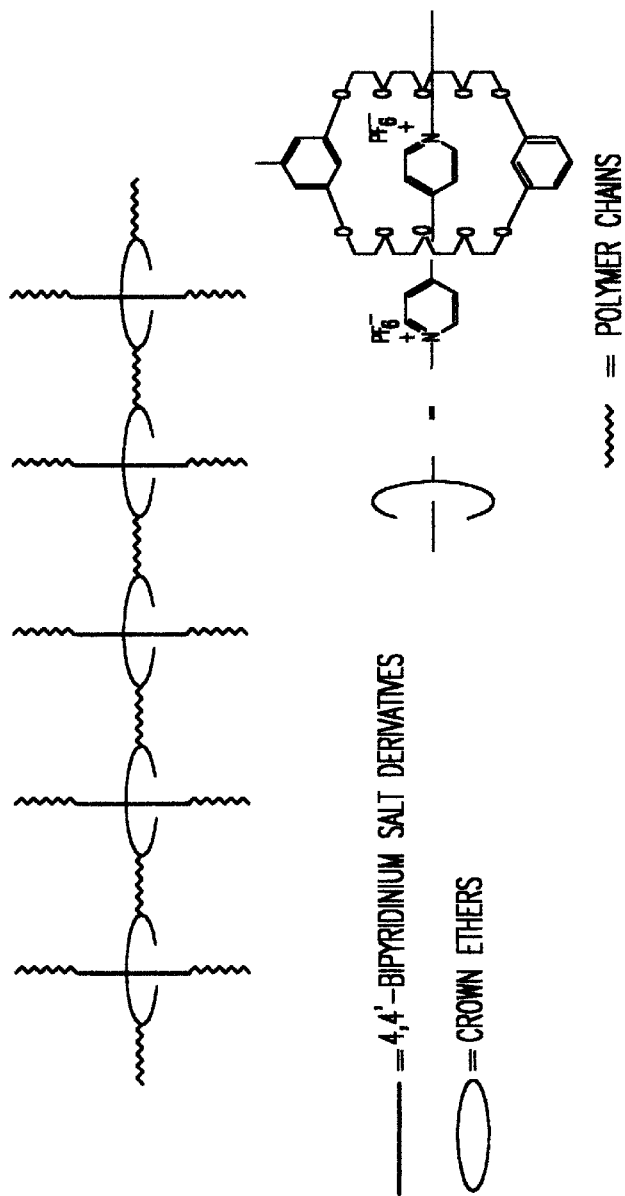
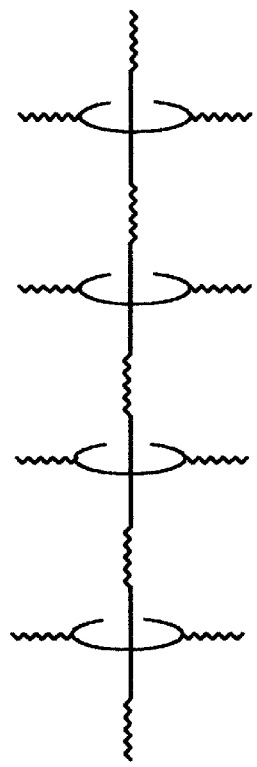
FIG. 10A
FIG. 10B $x \geq 1$

REVERSIBLE, MECHANICALLY INTERLOCKED POLYMERIC NETWORKS WHICH SELF-ASSEMBLE

BACKGROUND OF THE INVENTION

1. Field of the Invention

The invention is generally related to reversible, mechanically interlocking polymer networks which self-assemble in a reversible manner.

2. Description of the Prior Art

Both branched polymers and physically interlocked polymer systems have become very active research fields because of the potential for property tailoring and customization made possible due to the molecular architectures of these molecular systems.

As schematically depicted in FIG. 1, branched polymer materials 1 can be prepared by one-step reactions of $AB_x$ monomers, in which functional groups A and B react with each other and the coefficient x has a value of 2 or greater.

On the other hand, interlocking molecular systems of recent interest include rotaxane complexes. As schematically depicted in FIG. 2, rotaxane complexes are formed by noncovalent interactions between a main chain linear molecule 2' and a cyclic molecule (i.e., a macrocycle) 2" which results in physical "threading" of the cyclic molecule 2" onto the linear molecule string 2'. E.g., see Gibson, H., *Large Ring Molecules*, Semlyen, J. A. ed., J. Wiley and Sons, New York, 1996, 191–262. Strong driving forces are necessary for the threading to occur extensively. For example, sufficient inclusion complexation in this regard has been reported for cyclodextrin-based polyrotaxanes and sufficient hydrogen bonding in this regard has been reported for crown ether-based polyrotaxanes. E.g., see Harada, A., et al., *Macromolecules* 1995, 28, 8406; Gibson, H., et al., *J. Am. Chem. Soc.* 1995, 117, 852–874. Also, sterically large terminal blocking groups BG are often desirably formed on the linear molecular 2' string to prevent the decomplexation of the cyclic molecule 2". Many rotaxane complexes function as molecular "shuttles" by moving back and forth between identical stations along the length of the linear polymer.

U.S. Pat. No. 5,538,655 describes molecular complexes having rotaxane structures for use as electrolyte components. The electrolyte uses the molecular complex for ion transport via back and forth shuttling motions of the linear molecules of the rotaxane structures to effect ion transport through the electrolyte while polymerized cyclic molecule components of the rotaxane structures anchor the network complex. This ion transport function requires an ultimate polymerized molecular complex that is irreversibly formed. That is, the electrolyte using the molecular complex with rotaxane complexes for ion transport in this manner can include solvents which solubilize or gel (swell) the molecular complex but which implicitly do not dissociate the polymer back into the individual corresponding constituent polymers, as such dissociation would preclude the stated ion transport function of the molecular complex.

Against this background, it is an object of the present invention to construct complex, mechanically linked, reversible networks of polymers and copolymers for self assembly at a molecular level.

SUMMARY OF THE INVENTION

The present invention relates to the development of reversible (reprocessable) polymeric network structures formed by interpenetration of preformed polymers by self-assembly.

In one embodiment, a polymeric structure is provided having a first polymer including a linear segment and a second polymer including a macrocycle that is threaded onto the linear segment to form a rotaxane complex, in which the rotaxane complex is capable of reversibly dissociating back into the individual constituent polymers.

This reversible dissociation phenomenon associated with the inventive polymeric structures has been discovered to be controllable as a function of subjecting the polymeric structure to an external factor or condition, such as temperature increases and solvent exposure, effective to disrupt the equilibrated state of the rotaxane complex.

Although the invention should be understood to have broader implications and scope, in one specific implementation of this invention, a new topologic polymer material has been constructed involving the preparation of an interpenetrating polymeric network from prepolymers bearing host and guest sites as in-chain units, viz., 4,4'-bipyridinium salt moieties in linear polymers, with other polymers having macrocycles of crown ethers, respectively, as driven by self assembly. The formation of the supramolecule was directly proved by color change, proton NMR studies and GPC measurements described herein. Surprisingly, the polymer network that has been formed in this regard can be reversibly dissociated into the corresponding individual polymers under external influences such as DMSO solvent exposure, or by increasing the temperature of the network polymer effective to sufficiently decrease the dissociation constant of the aforesaid host and guest sites and provoke the dissociation.

BRIEF DESCRIPTION OF THE DRAWING

The foregoing and other objects, aspects and advantages will be better understood from the following detailed description of the preferred embodiments of the invention with reference to the drawings, in which:

FIG. 10A–K are schematic illustrations of other various mechanically linked polymer configurations possible with the present invention including comblike homopolymers or copolymers (FIGS. 10A–10B), graft homopolymers and/or copolymers (FIGS. 10C–H), block copolymers (FIGS. 10I–J), and branched polymers (FIG. 10K).

DETAILED DESCRIPTION OF THE PREFERRED EMBODIMENTS OF THE INVENTION

This invention is based on interpenetration of preformed polymers by self assembly of specific moieties incorporated into the chains and/or as pendant groups.

Figure 5A:
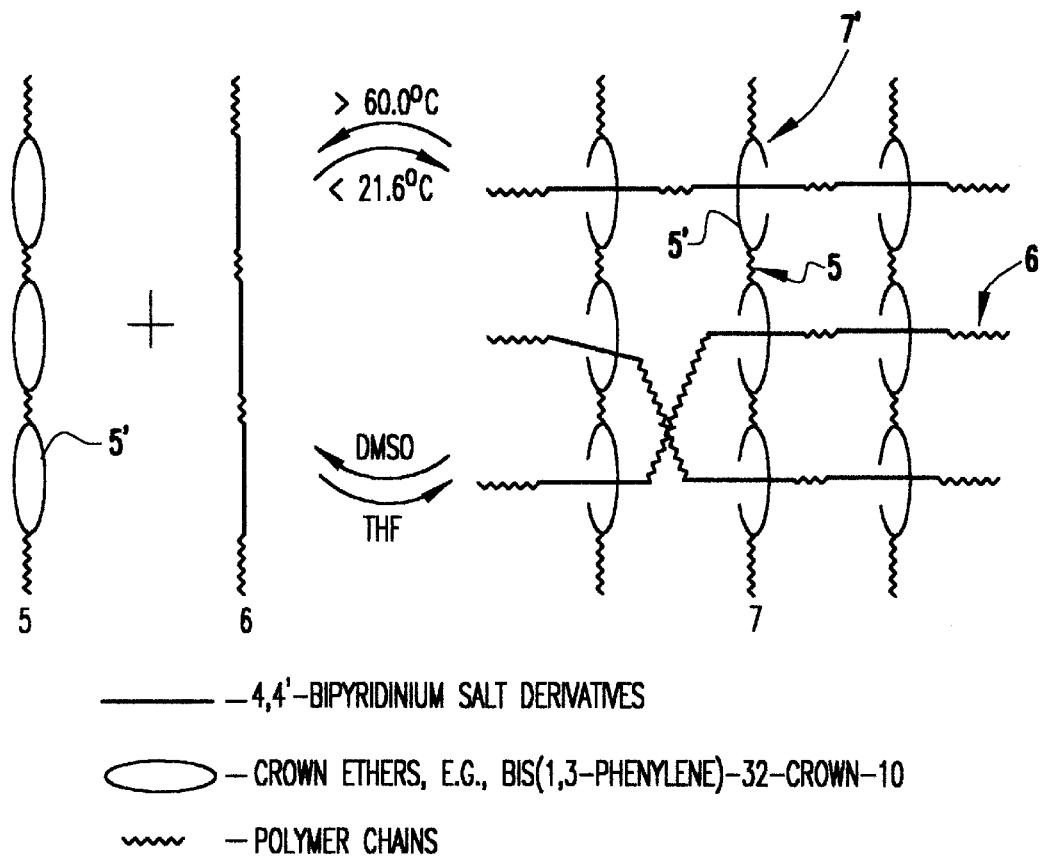
FIG. 5A is a schematic diagram showing the reversible formation of an interpenetrating polymeric network by linkages formed between linear polymer chains having bipyridinium salt moieties and poly(crown ether) polymers.

With reference to FIG. 5A, formation of an interpenetrating polymeric network 7 is indicated by linkages 7' formed between polymers 6 having bipyridinium salt moieties and polymers 5 including in-chain crown ether macrocycles. The mechanical linkage 7' is a non-covalent bond involving a physical threading of the in-chain crown ether macrocycle 5' of polymer 5 onto linear polymer 6 at its bipyridinium salt moieties.

It is a discovery of the present invention that the mechanical linkage 7' can be dissociated by external forces, e.g., temperature and/or solvent. Thus, reversible (i.e., reprocessable) network polymers 7 formed by self assembly now have been developed.

For instance, in the case of a mixture of a bis(1,3-phenylene)-32-crown-10 polymer as polymer 5 and a polyurethane copolymer having bipyridinium salt moieties as polymer 6 in tetrahydrofuran (THF), an interpenetrated network polymer 7 forms at a temperature of about room temperature (i.e., about 20–25° C.). However, surprisingly, if the same network polymer 7 is contacted with DMS0 as solvent, then the network polymer will spontaneously dissociate back into its individual constituent polymers 5 and 6. Similarly, if the individual poly (crown ether) polymer and the polyurethane copolymer having bipyridinium salt moieties, are initially mixed in DMSO, then the network 7 will not form.

Also, if increasing heat is applied to the system, the polymer network 7 will dissociate back into its individual constituent polymers 5 and 6 due to the thermal input. For instance, for a polymer system based on a mixture of a bis(1,3-phenylene)-32-crown-10 polymer and a polyurethane copolymer having bipyridinium salt moieties in tetrahydrofuran (THF), the network polymer 7 begins to dissociate at a temperature, e.g., about 32° C., above room temperature, and as the temperature is further elevated, the dissociation becomes complete as the temperature reaches about 60° C.

While not desiring to be bound to any particular theory at this time, it nonetheless is theorized that since the complexation of crown ethers and bipyridinium units is an equilibrium, that the extent of complexation can be controlled by manipulation of external conditions acting on the complex, such as temperature and solvent. For example, the higher the temperature is, the lower the association constant.

Thus, the complex polymer can be manipulated to dissociate back into the starting polymers by subjecting the complex polymer to the influence of sufficient external forces to overwhelm the association constant.

As can be appreciated, the critical temperatures controlling such dissociation behavior can be empirically determined for any given polymer system within the scope of the invention.

Also, other aprotic solvents in addition to DMSO, such as dimethylformamide, benzene, or hexamethyl phosphorus triamide (i.e., $P[N(CH_3)_2]_3$), are also considered capable of provoking dissociation of the network polymer 7 back into its individual constituent polymers 5 and 6.

As to polymer 5 containing the macrocycles in its polymer backbone, the macrocycles can be derived from cyclic ethers such as crown ethers, crown thioethers, aza-crowns, or, alternatively, even cyclodextrins. Examples and techniques for making such polymers containing macrocycles in the polymer backbone, particularly crown ethers, include those as described in U.S. Pat. No. 5,302,729 to Gibson et al., which teachings are incorporated herein by reference.

As to the polymers 6, these polymers must include at least one bipyridinium salt moiety along the length of the polymer. Other than the required bipyridinium salt moiety or moieties, the polymer 6 will include linear oligomer and polymer segments that can include, for example, polyurethane, polyalkylene, polyester, polyalkylene oxide, and combinations thereof. The polymer 6 should have sufficient length to permit its bipyridinium salt moiety (moieties) to interact favorably with the macrocycles on polymer 5 to form rotaxanes.

Although the invention is exemplified in detail in the examples below using certain preformed polyurethane copolymers incorporating the bipyridinium salt units (moieties) with bisphenylene-based crown ethers, the invention is considered generally adaptable to other polymer systems based on self assembling polymers having bipyridinium moieties and crown ether moieties provided the formation of the polymer network likewise is reversible under the influence of sufficient external forces.

The invention is suitable for both polycondensation and chain growth polymers and existing monomers provided the self assembly moieties can be used as comonomers or as end or pendant groups in a polymerization process. It can also be used for existing polymer systems with end groups containing self assembly moieties.

Figure 1:
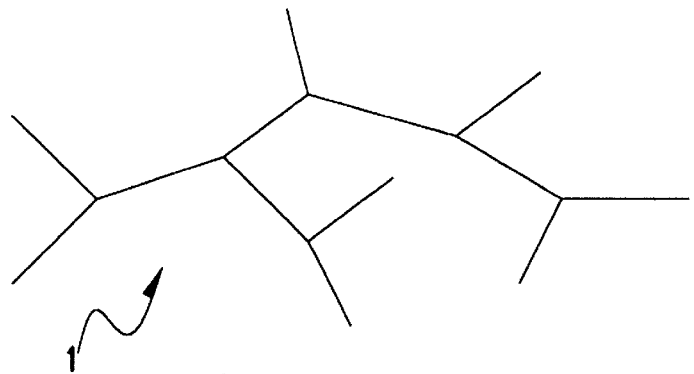
FIG. 1 is a schematic representation of a conventional branched polymer.
Figure 2:
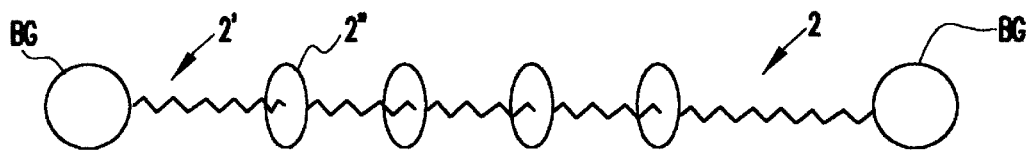
FIG. 2 is a schematic representation of a conventional rotaxane complex.
Figure 3:
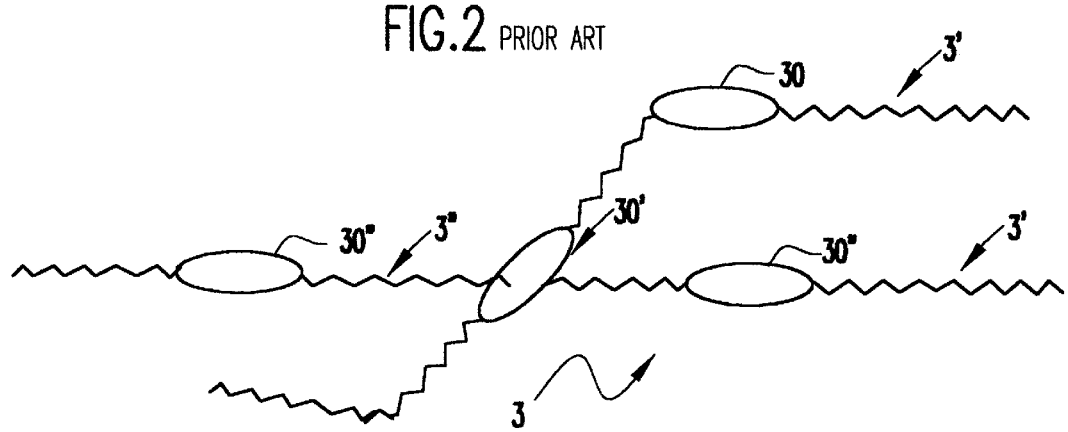
FIG. 3 is a schematic representation of a crosslinked polymer based on a main chain polyrotaxane with chains interlocked via an in-chain macrocycle.
Figure 4:
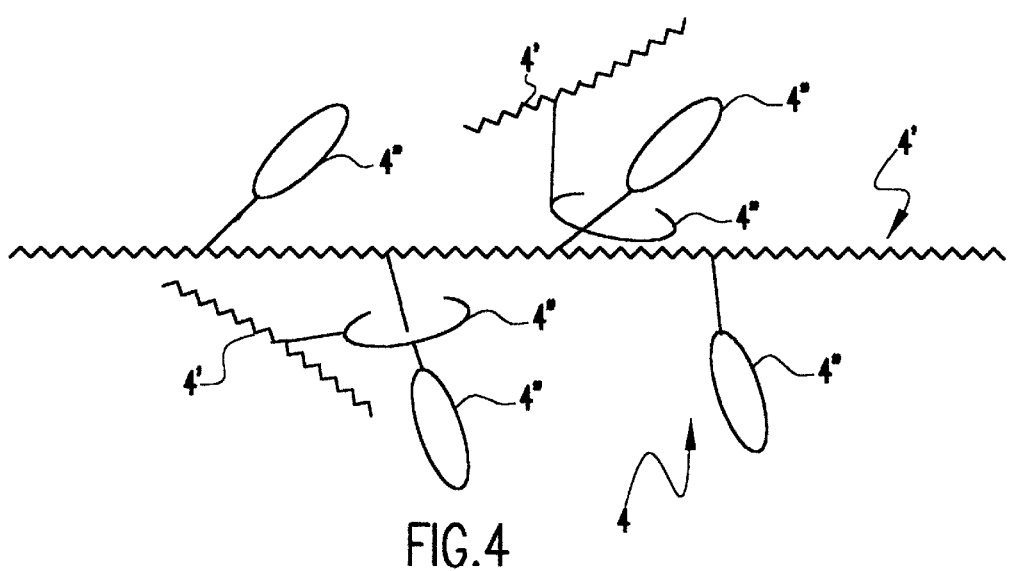
FIG. 4 is a schematic representation of mechanically-linked branched polymers in which linear polymer chains are interlocked to each other via pendant macrocycles.

For instance, the present invention can be applied to preparation of crosslinked polymers, such as schematically shown in FIG. 3, comprised of a main chain polyrotaxane 3 formed of interlocked polyrotaxanes 3' including linear polymer segments 3" and in-chain macrocycles 30. The macrocycles include a threaded ring 30', and rings 30" used as blocking groups. Alternatively, a side chain polyrotaxane 4 configuration can be provided with mechanically-linked branched polymers, such as schematically shown in FIG. 4, in which linear polymer chains 4' are interlocked to each other via pendant macrocycles 4". The main chain polyrotaxane 3 or side chain polyrotaxane 4 are synthesized by in situ threading during reaction by either polymerization or pendant group modification with hydrogen bonding as the driving force. Synthesis methods for making these rotaxane configurations are described in the inventors publication *J. Am. Chem. Soc.*, 1997, 119, 5862–5866, which is incorporated herein by reference. While the branching or crosslinking points are non-covalent, they are thermostable because in-chain macrocycles 30" in the main chain polyrotaxane (FIG. 3) or pendant macrocycles 4" in the side chain polyrotaxane (FIG. 4) play the role of blocking groups.

Figure 10C:
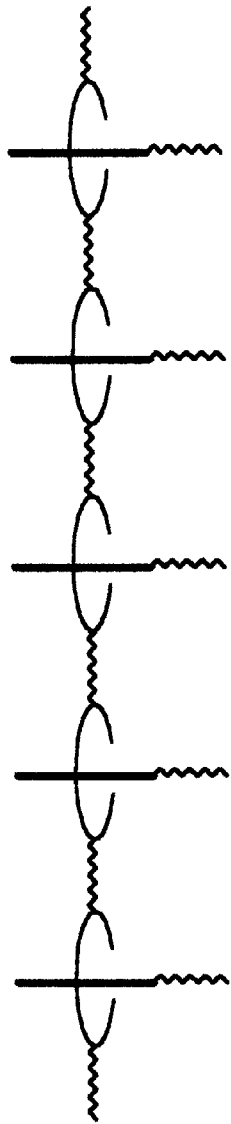
Figure 10D:
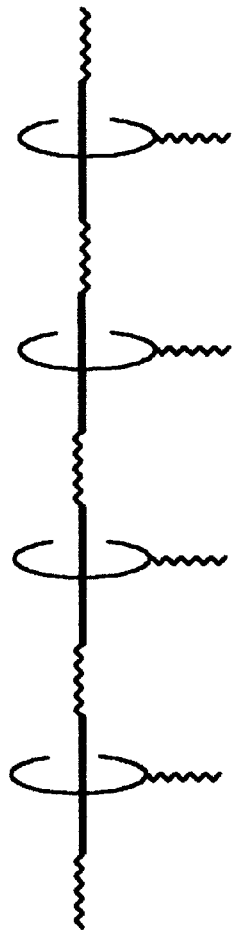
Figure 10E:
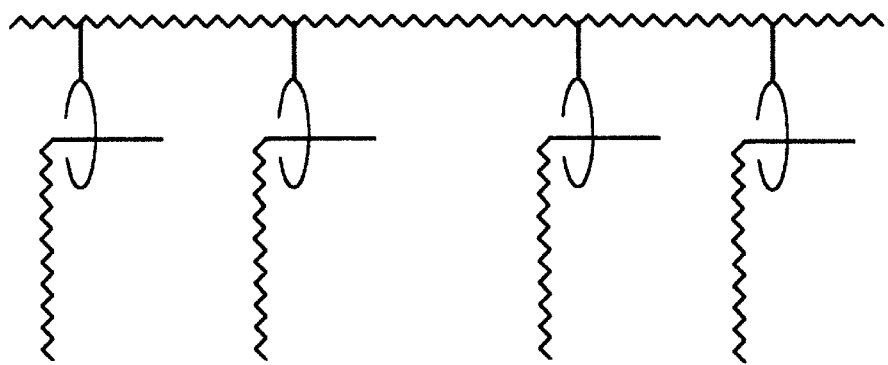
Figure 10F:
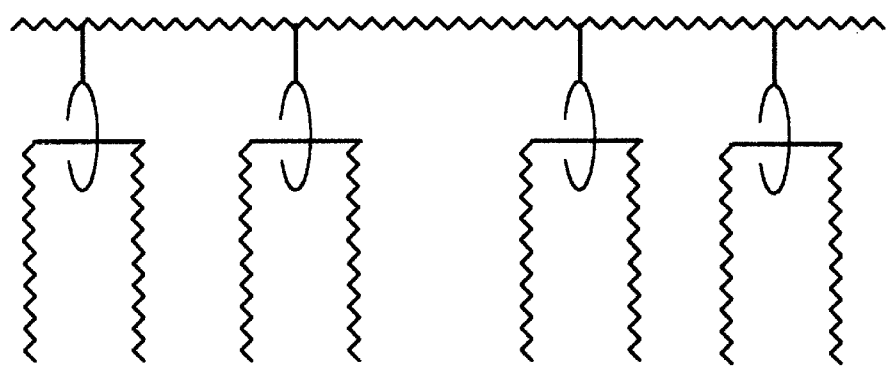
Figure 10G:
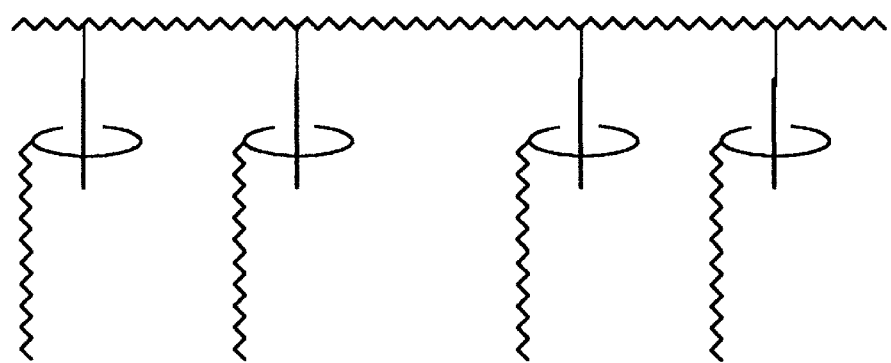
Figure 10H:
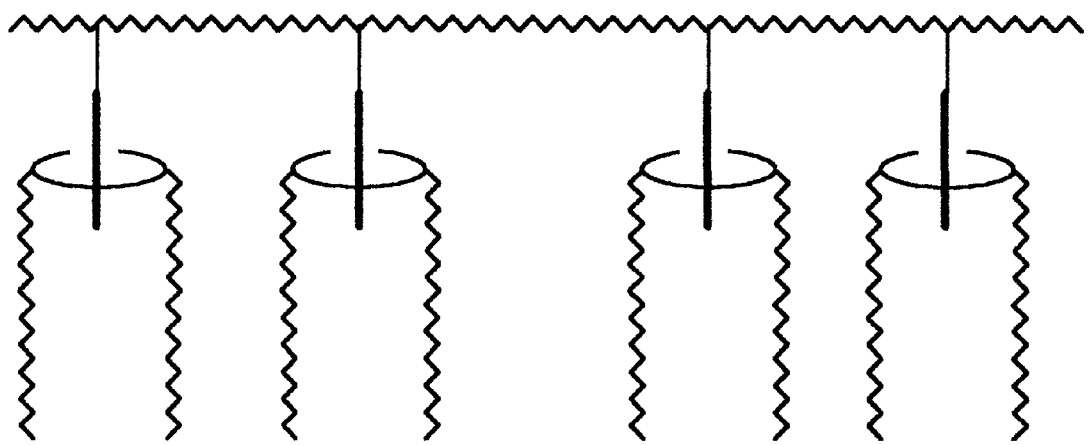
Figure 10I:
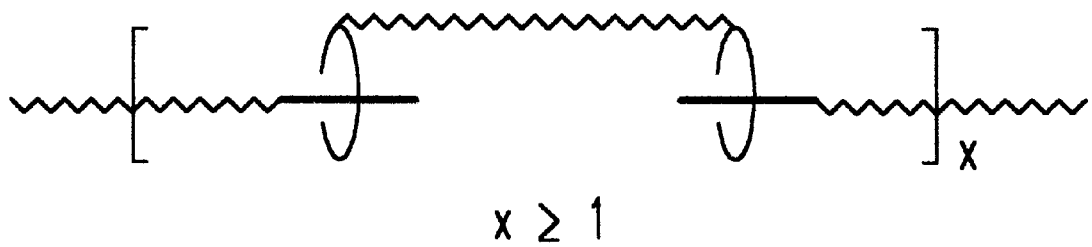
Figure 10J:
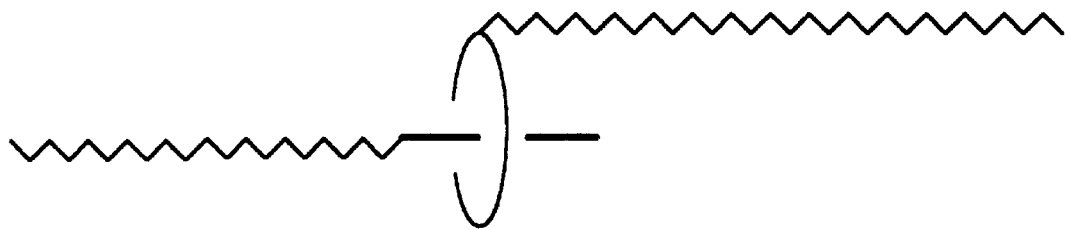
Figure 10K:
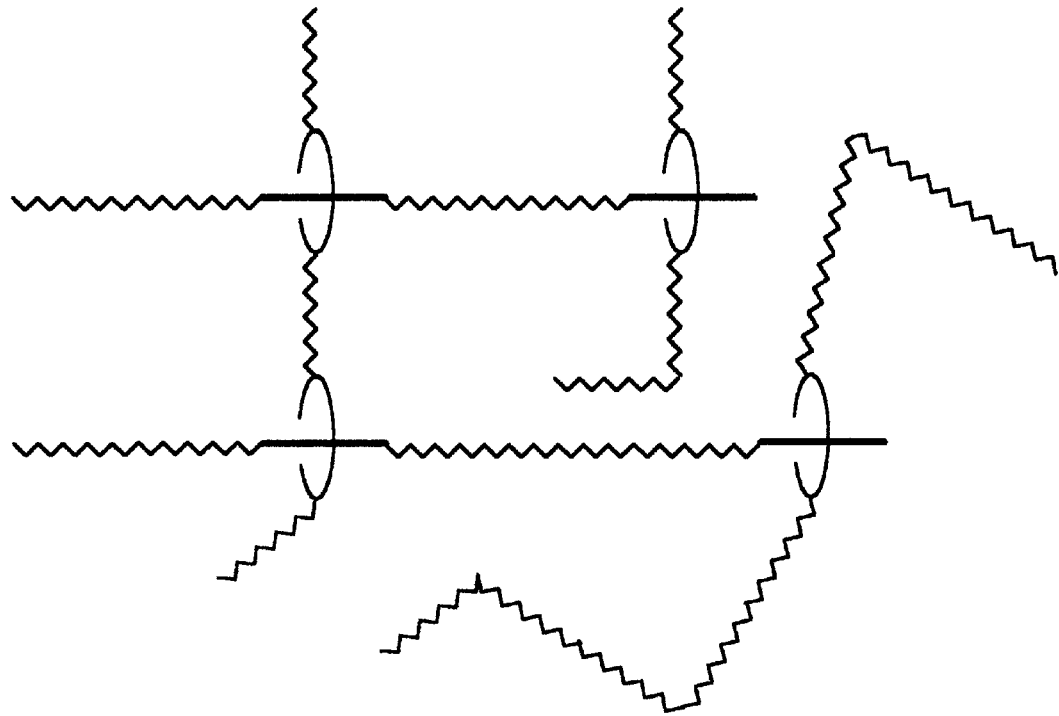

As can be appreciated from the foregoing discussions, the invention provides a versatile method for construction of not only crosslinked homopolymers and copolymers, such as depicted in FIGS. 3, 4, and 5A, but also other mechanically linked polymer configurations including comblike homopolymers or copolymers (FIGS. 10A–10B), graft homopolymers and/or copolymers (FIGS. 10C–H), block copolymers (FIGS. 10I–J), and branched polymers (FIG. 10K). The depicted structural symbols employed in FIGS. 10A–K all have the same meanings as defined in FIG. 10A.

By changing the compositions and the properties of the corresponding preformed polymers, viz., the different backbones of the polymers and copolymers, as well as the molar percentage of self assembly moieties, the properties of copolymers can be controlled for specific applications, e.g., melt viscosity, solution viscosity, compatibility, microphase and/or microphase separation, mechanical properties and processability.

The polymeric products of the invention could be used in a wide variety of implementations, such as compatibilizing polymer alloys, plasticizing polymers, adjustment of mechanical properties of polymer systems, control of melt rheology and solution viscosity, and reprocessing network polymers.

The following non-limiting examples will further illustrate the present invention. All parts, ratios, concentrations, and percentages are based upon weight unless otherwise specified.

EXAMPLES

Example 1

Figure 6:
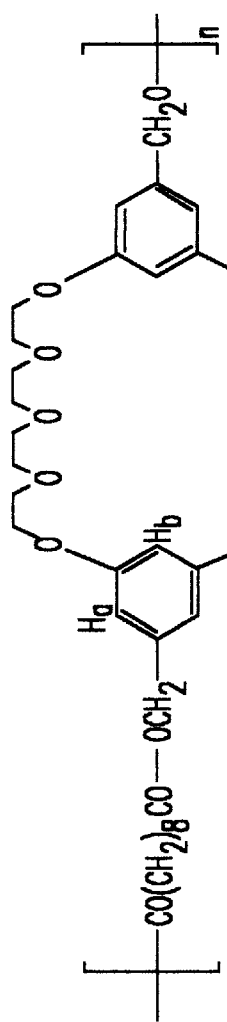
FIG. 6 shows the chemical structures of poly(sebacate crown ether) and a copolyurethane having bipyridinium salt moieties used in the examples described herein.
Figure 6:
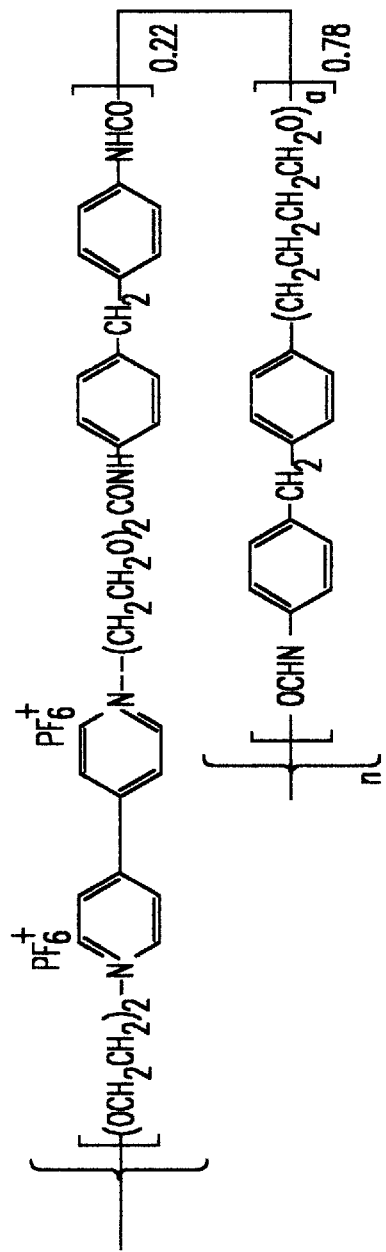

Preformed poly(sebacate crown ether), having the chemical formula 5 shown in FIG. 6 where the coefficient n had an integer value greater than one, was prepared by polycondensation of bis(5-hydroxymethyl-1,3-phenylene)-32-crown-10 and sebocyl chloride in a mixture of anhydrous diglyme and DMSO (1:1, vol.) at 60° C. for 2 days. Copolyurethane ($M_n$=11.9 kg/mol and PDI=3.78 measured by GPC with universal calibration in NMP (LiBr 1%) at 65° C.), and having the chemical formula shown in FIG. 6 containing paraquat moieties, was obtained by refluxing a solution of N,N'-bis(hydroxyethoxy-ethoxy)-4,4'-pyridinium 2 $PFG_6^+$, poly(tetramethylene-oxide) (PTMO, dihydroxy terminated, MW=1000) and 4,4'-methylenebis(p-phenylene isocyanate) (MDI) in a mixture of anhydrous diglyme and acetonitrile (1:1, vol.) for 12 hours. Both preformed polymers 5 and 6 were purified by precipitation into methanol.

The preformed poly(sebacate crown ether) polymer and the copolyurethane polymer were mixed together with stirring in THF at 21.6° C. for several different batches involving different polymer mixing ratios to provide the various polymeric concentration ratios described below in connection with FIG. 3.

Figure 5B:
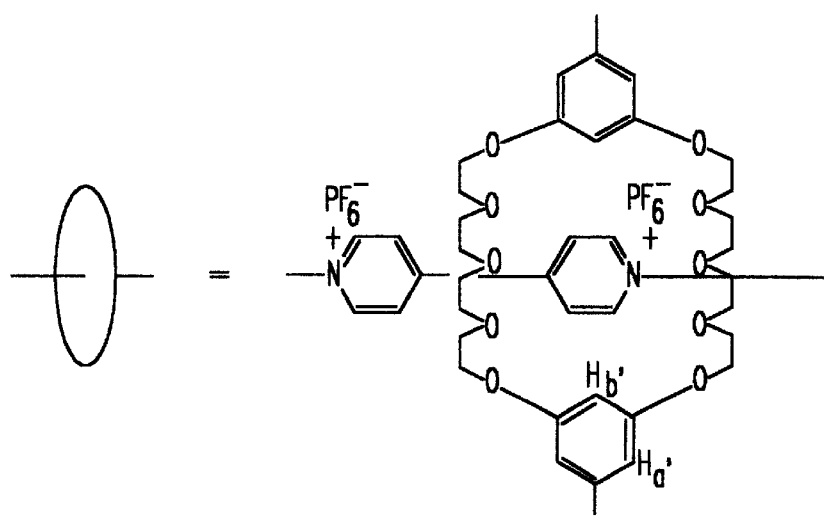
FIG. 5B is an enlarged illustration of the mechanical linkages in the polymeric network shown in FIG. 5A showing, on a molecular level, the threading of linear polymer chains at the bipyridinium salt moieties through the crown ether macrocycle structures.

A three dimensional polyrotaxane, which is schematically shown as a knitted-type network structure 7 in FIG. 5A, was formed by the self assembly of the preformed poly(sebacate crown ether) polymer 5 and copolyurethane polymer 6, also schematically shown in FIG. 5A. FIG. 5B schematically shows, from a molecular perspective, the resulting threading of a linear copolyurethane polymer through a crown ether macrocyclic structure according to the resulting rotaxane complex.

The occurrence of such rotaxane complexation was indicated by color changes and verified by chemical shift changes of the aromatic signals of both bipyridinium and macrocyclic units. Namely, as soon as the preformed colorless poly(sebacate crown ether) polymer and the light yellow-colored copolyurethane polymer were mixed in the THF, a deep orange color appeared in the mixture. This color change indicated interpenetration which occurred rapidly. More directly, and as shown by the NMR spectra data plotted in FIG. 7, 400 MHZ proton NMR spectra taken revealed a significant upfield shift in the signal for protons $H_a$ and $H_b$ of the macrocylic units of the preformed poly (sebacate crown ether) polymer in its mixture with the copolyurethane in THF (see data curves b)–d)) as compared to the data curve a) taken for the pure preformed poly (sebacate crown ether) polymer alone in THF. The signal for protons $H_a$ and $H_b$ were based on 400 MHZ proton NMR spectra of polymer mixtures as follows: a) 0 mM copolyurethane polymer based on bipyridinium moieties, 1.43 mM poly(sebacate crown ether) polymer based on cyclic moieties, in THF-$d_8$ at 21.6° C.; and b) 3.82 mM copolyurethane polymer, 1.43 mM poly(sebacate crown ether) polymer, in THF-$d_8$ at 21.6° C. The concentrations of polymer mixtures (c)–e), for which the NMR spectral results are also shown in FIG. 7, were as follows: c) 3.82 mM copolyurethane polymer based on bipyridinium moieties, 4.00 mM poly(sebacate crown ether) polymer based on cyclic moieties, in THF-$d_8$ at 21.6° C.; d) 3.82 mM copolyurethane polymer, 12.58 mM poly(sebacate crown ether) polymer, in THF-$d_8$ at 21.6° C.; and e) 3.82 mM copolyurethane polymer, 0 mM poly(sebacate crown ether) polymer, in THF-$d_8$ at 21.6° C.

Figure 7:
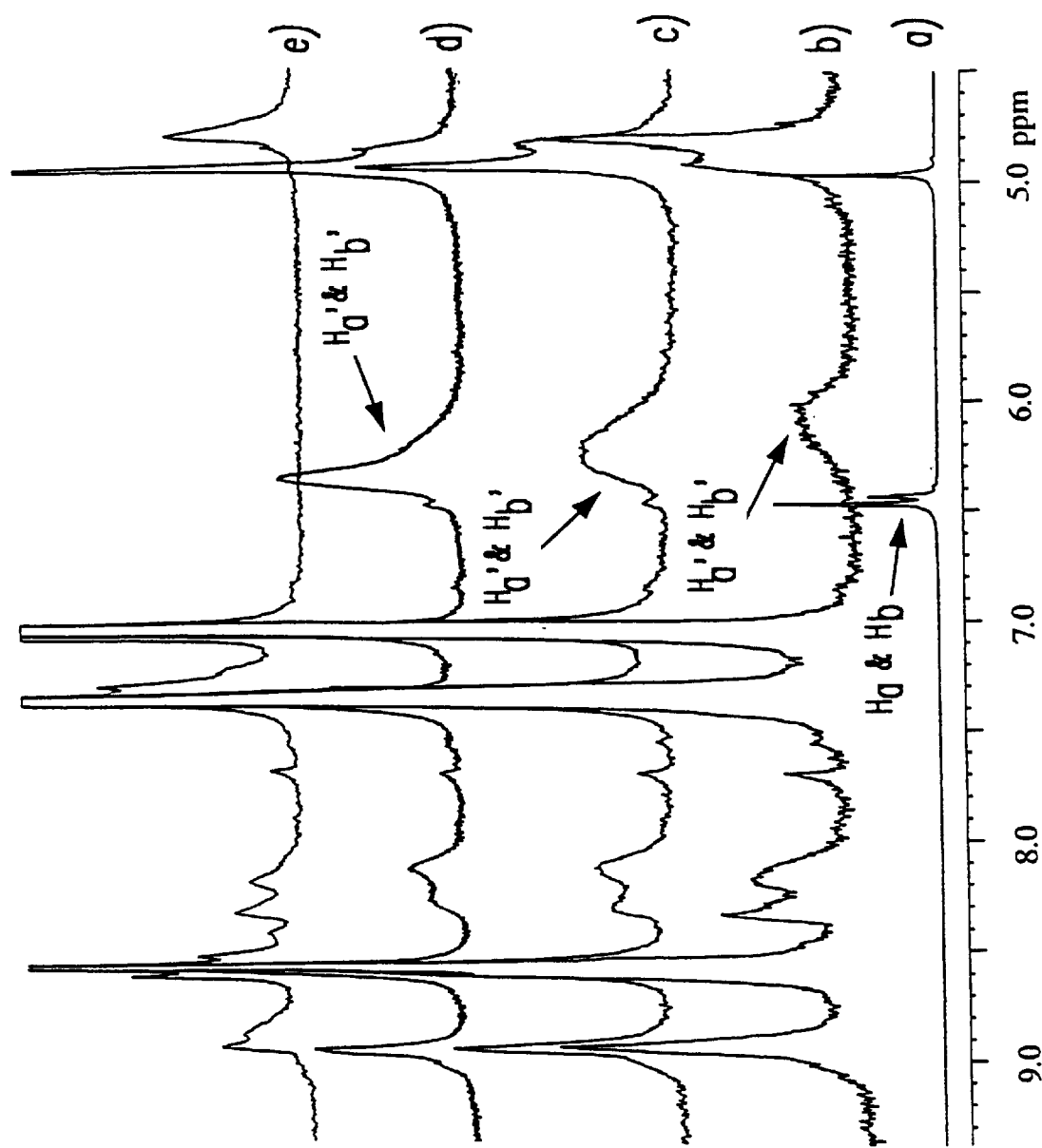
FIG. 7 is a graphical illustration of 400 MHZ proton spectral data results obtained for mixtures of poly(sebacate crown ether) and a copolyurethane having bipyridinium salt moieties in THF at several different respective mixing concentrations.

As shown in FIG. 7, the chemical shifts of protons $H_a$ and $H_b$ increased with increasing fraction of the poly(sebacate crown ether) polymer in the polymer mixture, and this is attributed to a lower fraction of cyclic units being occupied by the bipyridinium moieties. It was also found that the shapes and chemical shifts of the signal for protons $H_a$ and $H_b$ did not change with mixing times of up to 24 hours. This indicated that self-assembly occurred within 30 seconds as the observed shortest time necessary for a NMR spectrum to be acquired. The proton NMR results directly proved the formation of an interpenetrating polymer network by self-assembly.

Example 2

Experimental studies were also conducted to confirm that a higher molecular weight and polydispersity (PDI) were exhibited for a three dimensional polyrotaxane polymeric network product made according to the procedures described in Example 1, as compared to its individual poly(sebacate crown ether) polymer and copolyurethane polymer precursors. This was accomplished by measuring molecular weights for several different polymer mixtures in THF of poly(sebacate crown ether) (PSCE) and copolyurethane (CPU) polymers of the types described in Example 1 by gel permeation chromatography (GPC) with polystyrene standards at room temperature (i.e., 21.6° C.). The results are reported in reported in Table 1.

TABLE 1

| Run | PSCE (g/L[a]; mM[c]) | CPU (g/L[a]; mM[c]) | $M_n$[d] (kg/mol) | $M_n$[d] (kg/mol) | PDI[d] |
|---|---|---|---|---|---|
| aa | 3.00; 3.93 | 0.00; 0.00 | 8.01 | 36.9 | 4.60 |
| bb | 1.00; 1.31 | 20.0; 3.82 | 2.66 | 26.1 | 9.80 |
| cc | 2.00; 2.62 | 20.0; 3.82 | 3.25 | 37.3 | 11.5 |
| dd | 4.00; 5.24 | 20.0; 3.82 | 3.17 | 53.7 | 16.9 |
| ee | 6.00; 7.86 | 20.0; 3.82 | 3.37 | 70.2 | 20.8 |
| ff | 8.00; 10.4 | 20.0; 3.82 | 3.53 | 164.0 | 46.5 |
| gg | 0.00; 0.00 | 20.0; 3.82 | 1.46 | 9.41 | 6.43 |

[a]based on total polymer
[b]based on bispyridinium salt moiety
[c]based on cyclic repeat unit
[d]measured by GPC with polystyrene stds. in THF at 21.6° C.

Figure 8:
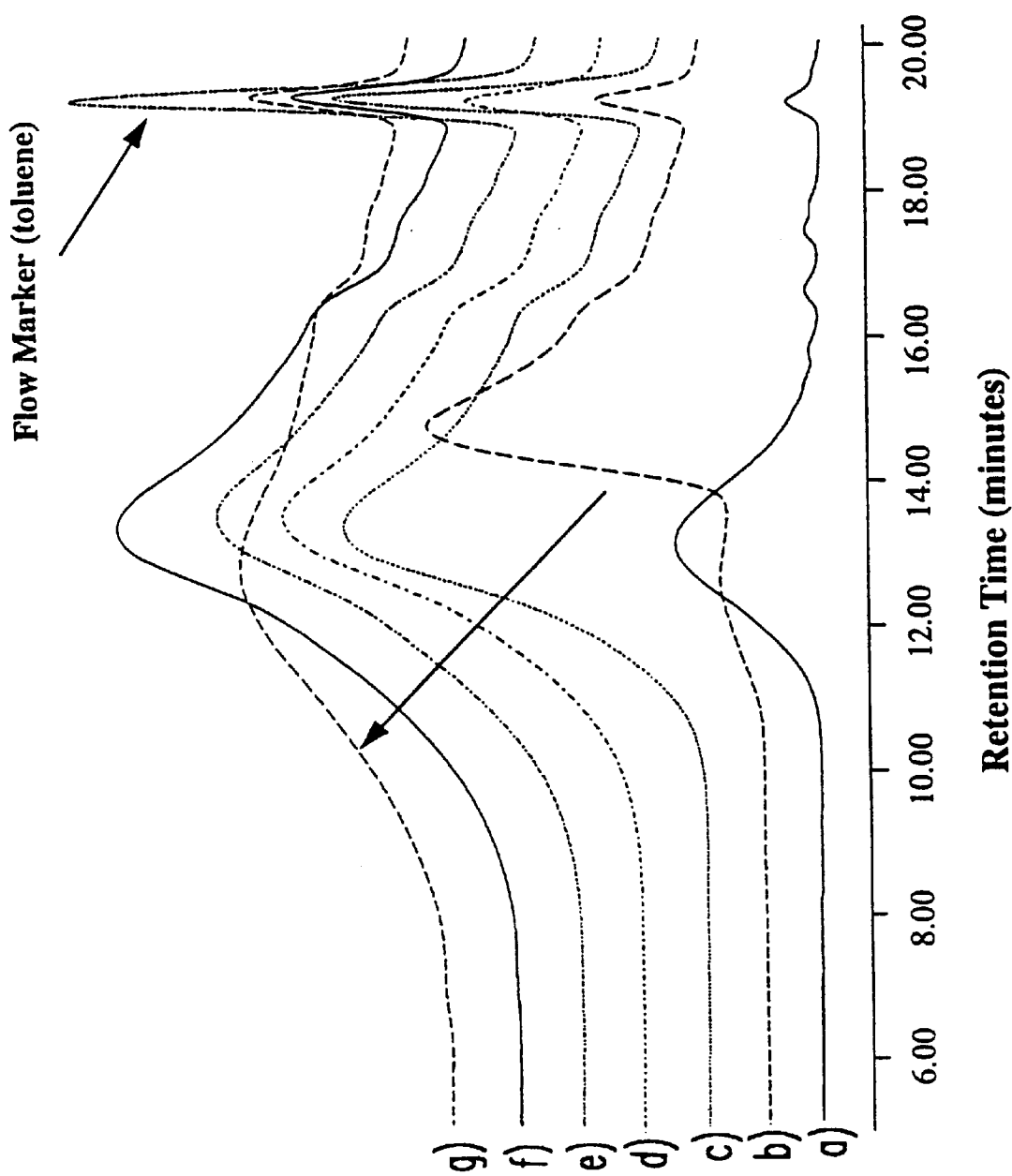
FIG. 8 is a graphical illustration of gel permeation chromatography data results obtained for mixtures of poly (sebacate crown ether) and a copolyurethane having bipyridinium salt moieties in THF with polystyrene standards at room temperature (i.e., 21.6° C.) at several different respective mixing concentrations.

The GPC retention time data generated for runs aa)–gg) is graphically shown in FIG. 8. Compared to the molecular weight and PDI measurements for the pure copolyurethane taken from GPC measurements in salt solution with universal calibration in NMP (LiBr 1%) at 65° C. (viz., $M_n$=11.9 kg/mol; PDI=3.78), molecular weights measured for run gg involving the pure copolyurethane were quite different in THF with polystyrene standards (viz., $M_n$=1.46 kg/mol; PDI=6.43). This difference was attributed to polyelectrolyte effect. Therefore, the molecular weight values reported in Table 1 are not considered to represent the precise values for molecular weights; however, they do accurately reflect relative changes in molecular weight and PDI since they were measured under identical conditions. Indeed, upon addition of 1 g of the poly(sebacate crown ether) polymer into a solution of 20 g of the copolyurethane in 1 liter of THF, both the molecular weight and PDI increased as seen in the data reported in Table 1 and the graphs in FIG. 4. This result directly proved that larger supramolecules were indeed formed by self assembly.

Also of interest, both molecular weights and PDI increased as a function of increasing concentration of the poly(sebacate crown ether) polymer in the polymer mixture. As seen in Table 1, PDI as high as 46.5 and a molecular weight $M_n$ as high as 164 kg/mol were achieved despite the fact that the individual poly(sebacate crown ether) and copolyurethane polymers had molecular weights of 36.9 kg/mol and 9.41 kg/mol, respectively. These results were consistent with the formation of an interpenetrating polymeric network structure 7 such as depicted in FIG. 5A.

Example 3

Further experimental studies were conducted to investigate the effect of external forces on the state of equilibrium of the crown ether and bipyridinium units complex in the polymer structures made according to the procedures described in Example 1.

To study the effect of solvent on the complex, the poly (sebacate crown ether) and copolyurethane polymers as described in Example 1 were instead added to dimethyl sulfoxide (DMSO) at 21.6° C. with stirring for several different batches involving different polymer mixing ratios to provide the various polymeric concentration ratios described below in connection with FIG. 9.

Figure 9:
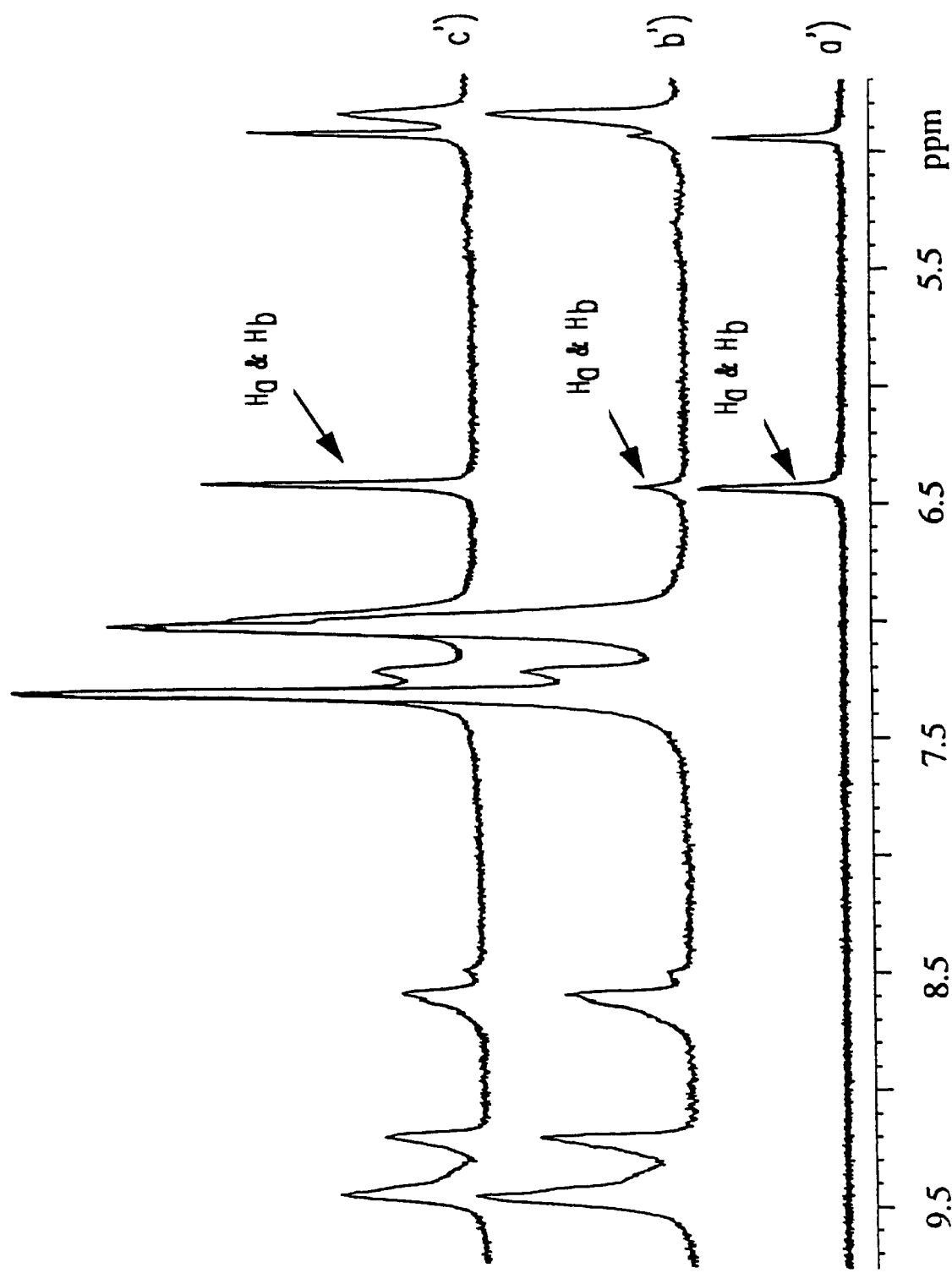
FIG. 9 is a graphical illustration of 400 MHZ proton spectral data results obtained for mixtures of poly(sebacate crown ether) and a copolyurethane having bipyridinium salt moieties in DMSO at several different respective mixing concentrations.

FIG. 9 shows the signal for protons $H_a$ and $H_b$ based on 400 MHZ proton NMR spectra taken of the polymer mixtures as follows: a') 0 mM copolyurethane polymer based on bipyridinium moieties, 1.43 mM poly(sebacate crown ether) polymer based on cyclic moieties, in DMSO-$d_6$ at 21.6° C.; b') 3.82 mM copolyurethane polymer, 1.43 mM poly (sebacate crown ether) polymer, in DMSO-$d_6$ at 21.6° C.; and c') 3.82 mM copolyurethane polymer based on bipyridinium moieties, 4.00 mM poly(sebacate crown ether) polymer based on cyclic moieties, in DMSO-$d_6$ at 21.6° C.

As the graphs show in FIG. 9, the chemicals shifts of protons $H_a$ and $H_b$ of the cyclic moiety in the preformed polymeric crown ether, as well as those of the preformed copolyurethane, did not change upon mixing in the DMSO. This observation indicates that no complexation occurred between the preformed polymeric crown ether and the preformed copolyurethane in DMSO.

Example 4

To study the effect of temperature on the complex, the poly(sebacate crown ether) and copolyurethane polymers as described in Example 1 were added to THF at 21.6° C. with stirring as in Example 1. Then, by varying the temperature of the mixture, it was observed that the signal for protons $H_a$ and $H_b$ based on 400 MHZ proton NMR spectra taken for mixtures of the preformed polymeric crown ether and the preformed copolyurethane formed in THF at 21.6° C., as made according procedures described in Example 1 for each of mixtures b), c), and d), shifted downfield when the temperature was increased to 31.7° C. and back to that of the pure polymeric crown ether preformed polymers at 60° C.

Thus, the formation of the polymeric network also was observed to depend on temperature, and lower temperatures tend to favor formation of the polymer network as opposed to the dissociated individual preformed polymeric starting materials.

While the invention has been described in terms of its preferred embodiments, those skilled in the art will recognize that the invention can be practiced with modification within the spirit and scope of the appended claim.

What is claimed is:

1. A reversible rotaxane polymer network comprising a first polymer including a linear segment and a second polymer including at least one macrocycle bonded to said second polymer, said macrocycle being capable of being physically threaded onto said linear segment to form a rotaxane complex by a first external factor selected from the group consisting of solvent exposure, temperature change and combinations thereof to create a polymer network from said first and second polymers wherein said first and second polymers are joined by said rotaxane complex, said macrocycle being capable of being physically unthreaded from said linear segment by a second external factor selected from the group consisting of solvent exposure, temperature change, and combinations thereof, wherein said linear segment of said first polymer includes one or more of a 4,4'-bipyridinium moiety.

2. The reversible rotaxane polymer network of claim 1, wherein said first polymer is selected from the group consisting of a polyurethane copolymer, a polyester copolymer, a polycarbonate copolymer, a polyurea copolymer, a copolyether, a copolyonene, and a vinyl copolymer.

3. The reversible rotaxane polymer network of claim 1, wherein said first polymer comprises a polyurethane copolymer including a backbone containing said one or more 4,4'-bipyridinium moieties and urethane linkages.

4. The reversible rotaxane polymer network of claim 1 wherein said macrocycle is a crown ether.

5. A process for making a reversibly crosslinked polymeric structure, comprising the step of combining a first polymer including a linear segment with a second polymer including a macrocycle in a manner effective to physically thread said macrocycle onto said linear segment to form a rotaxane complex, wherein said rotaxane complex is capable of reversibly dissociating into individual polymers comprised of said first and second polymers upon exposure to an external factor selected from the group consisting of an aprotic solvent, and a temperature increase of 60° C. or greater.

6. The process of claim 5, wherein said aprotic solvent is selected from the group consisting of dimethylsulfoxide, dimethylformamide, and hexamethyl phosphorus triamide.

7. The process of claim 5 wherein said macrocycle is a crown ether and said linear segment includes one or more of a 4,4'-bipyridinium moiety.

8. A process for separating a reversibly crosslinked polymeric structure into distinct polymer units wherein said reversibly crosslinked polymer structure comprises a first polymer including a linear segment and a second polymer including at least one macrocycle bonded to said second polymer, said macrocycle being capable of being physically threaded onto said linear segment to form a rotaxane complex by a first external factor selected from the group consisting of solvent exposure, temperature change, and combinations thereof to create a polymer network from said first and second polymers wherein said first and second polymers are joined by said rotaxane complex, said process comprising the step of separating said first and second polymers by exposing said rotaxane complex to an external factor selected from the group consisting of an aprotic solvent, and a temperature increase of 60° C. or greater.

9. The process of claim 8 wherein said macrocycle is a crown ether and said linear segment includes one or more of a 4,4'-bipyridinium moiety.

* * * * *